United States Patent [12]
Jeyachandran et al.

(10) Patent No.: US 12,457,051 B2
(45) Date of Patent: Oct. 28, 2025

(54) RADIO HEAD UNIT WITH DYNAMICALLY UPDATED TUNABLE CHANNEL LISTING

(71) Applicant: Gracenote, Inc., Emeryville, CA (US)

(72) Inventors: Suresh Jeyachandran, Alameda, CA (US); Damon P. Fasching, San Francisco, CA (US); Hidenori Tanaka, San Francisco, CA (US); Kaviarasu Vetriselvi, Walnut Creek, CA (US); Samit Raul, San Francisco, CA (US); Ashley Michelle Adams, Walnut Creek, CA (US)

(73) Assignee: Gracenote, Inc., New York, NY (US)

( * ) Notice: Subject to any disclaimer, the term of this patent is extended or adjusted under 35 U.S.C. 154(b) by 373 days.

(21) Appl. No.: 17/969,407

(22) Filed: Oct. 19, 2022

(65) Prior Publication Data

US 2023/0126270 A1    Apr. 27, 2023

Related U.S. Application Data

(60) Provisional application No. 63/270,832, filed on Oct. 22, 2021.

(51) Int. Cl.
*H04H 60/73* (2008.01)
*H04H 40/18* (2008.01)
*H04H 60/41* (2008.01)

(52) U.S. Cl.
CPC ............ *H04H 60/73* (2013.01); *H04H 40/18* (2013.01); *H04H 60/41* (2013.01)

(58) Field of Classification Search
CPC ........ H04H 60/73; H04H 60/74; H04H 40/18; H04H 60/41; H04H 60/43; H04H 60/42; H04H 60/44; H04H 20/62; H04H 20/72; H04H 60/85; H04H 60/91; H04H 60/49
See application file for complete search history.

(56) References Cited

U.S. PATENT DOCUMENTS

| 7,996,018 B1 | 8/2011 | Fan |
| 2006/0195239 A1 | 8/2006 | Teichner et al. |
| 2010/0304702 A1 | 12/2010 | Anzures et al. |

(Continued)

FOREIGN PATENT DOCUMENTS

| EP | 1892835 B1 | 10/2008 |
| EP | 3490172 A1 | 5/2019 |
| KR | 20190131172 A | 11/2019 |

OTHER PUBLICATIONS (WO 2021071466 A1), Venezia, Connected Radio Local Isolated, and Hybid Implementation, Apr. 14, 2021, pp. 1-3 (Year: 2021).*

(Continued)

*Primary Examiner* — Keith Ferguson
(74) *Attorney, Agent, or Firm* — McDonnell Boehnen Hulbert & Berghoff LLP (57) ABSTRACT

In one aspect, an example method includes (i) encountering, by a media playback device of a vehicle, a trigger to update a list of currently tunable radio stations; (ii) based on encountering the trigger to update the list of currently tunable radio stations, updating, by the media playback device, the list of currently tunable radio stations using a location of the vehicle and radio station contour data stored in a local database of the media playback device; and (iii) displaying, by the media playback device, a station list using the list of currently tunable radio stations.

20 Claims, 6 Drawing Sheets (56) References Cited

U.S. PATENT DOCUMENTS

2013/0309978 A1    11/2013  Weng
2017/0279551 A1*    9/2017  Husmann ............... H04H 20/93
2020/0343986 A1    10/2020  Aggarwal et al.
2021/0044368 A1*    2/2021  Lerner .................. H04H 60/90

OTHER PUBLICATIONS (JP 2004040380 A), Mori et al., Communication terminal and Digital Broadcast Reception System, Feb. 5, 2004, pp. 1-10 (Year: 2004).*
International Search Report and Written Opinion for Int. App. No. PCT/US2022/047219, mailed Feb. 23, 2023.

* cited by examiner

RADIO HEAD UNIT WITH DYNAMICALLY UPDATED TUNABLE CHANNEL LISTING

CROSS-REFERENCE TO RELATED APPLICATIONS

This disclosure claims priority to U.S. Provisional Pat. App. No. 63/270,832 filed Oct. 22, 2021, which is hereby incorporated by reference in its entirety.

BACKGROUND

Existing terrestrial radios are configured to scan to automatically detect channels that are tunable. While a vehicle is traveling, the set of channels that may be tunable for the vehicle changes in accordance with the availability of radio signals at different locations. Existing approaches for scanning for available radio stations while receiving content for a given radio station involve utilizing a secondary tuner that is separate from a primary tuner that is tuned to the given radio station.

SUMMARY

In one aspect, an example method is disclosed. The method includes (i) encountering, by a media playback device of a vehicle, a trigger to update a list of currently tunable radio stations; (ii) based on encountering the trigger to update the list of currently tunable radio stations, updating, by the media playback device, the list of currently tunable radio stations using a location of the vehicle and radio station contour data stored in a local database of the media playback device; and (iii) displaying, by the media playback device, a station list using the list of currently tunable radio stations.

In another aspect, an example computing system is disclosed. The computing system is configured for performing a set of acts including (i) encountering a trigger to update a list of currently tunable radio stations for a media playback device of a vehicle; (ii) based on encountering the trigger to update the list of currently tunable radio stations, updating the list of currently tunable radio stations using a location of the vehicle and radio station contour data stored in a local database of the media playback device; and (iii) displaying a station list using the list of currently tunable radio stations.

In another aspect, an example non-transitory computer-readable medium is disclosed. The computer-readable medium has stored thereon program instructions that upon execution by a processor, cause performance of a set of acts including (i) encountering a trigger to update a list of currently tunable radio stations for a media playback device of a vehicle; (ii) based on encountering the trigger to update the list of currently tunable radio stations, updating the list of currently tunable radio stations using a location of the vehicle and radio station contour data stored in a local database of the media playback device; and (iii) displaying a station list using the list of currently tunable radio stations.

DETAILED DESCRIPTION

I. Overview

As noted above, existing approaches for scanning for available radio stations while receiving content for a given radio station involve utilizing a secondary tuner that is separate from a primary tuner that is tuned to the given radio station. The inclusion of a secondary tuner can increase the cost, size, and complexity of a vehicle's head unit. The process for scanning for all available radio stations can also take several minutes to complete, leading to a poor user experience.

Disclosed herein are methods and systems to address these and potentially other issues. In an example method, a media playback device of a vehicle encounters a trigger to update a list of currently tunable radio stations. Based on encountering the trigger to update the list of currently tunable radio stations, the media playback device updates the list of currently tunable radio stations using a location of the vehicle and radio station contour data stored in a local database of the media playback device. The media playback device then displays a station list using the list of currently tunable radio stations.

While portions of this disclosure refer to media playback devices that are located in terrestrial vehicles, the examples are not meant to be limiting. The systems and methods disclosed herein are also applicable to media playback devices that are located in other types of vehicles, such as aerial vehicles or watercraft. Similarly, the systems and methods disclosed herein are also applicable to media playback devices that are not located in vehicles, such as portable media playback devices or stationary media playback devices that are located in homes, offices, or other buildings.

In addition, while portions of this disclosure refer to radio stations and media playback devices that present audio content, the examples are not meant to be limiting. One of ordinary skill in the art will appreciate that the systems and methods disclosed herein can extend to apply in other scenarios as well, such as with respect to television stations and media playback devices that present video content.

II. Example Architecture

A. Computing Device

Figure 1:
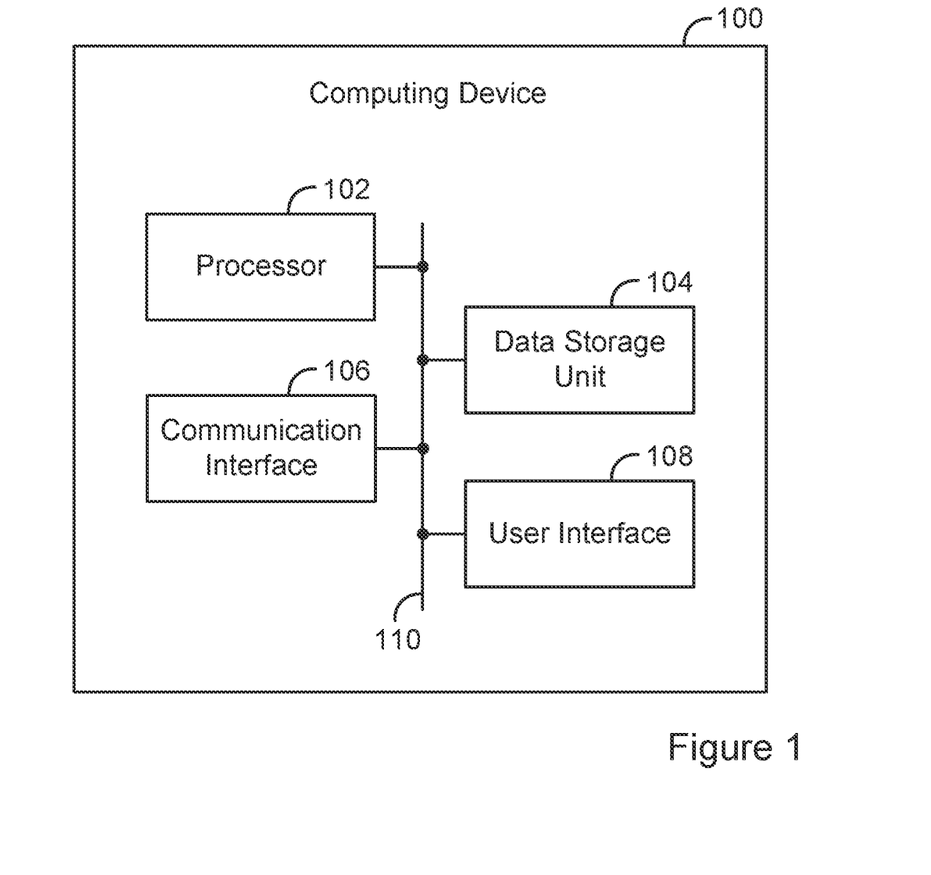
FIG. 1 is a simplified block diagram of an example computing device.

FIG. 1 is a simplified block diagram of an example computing device 100. The computing device 100 can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

B. Radio Station System

Figure 2:
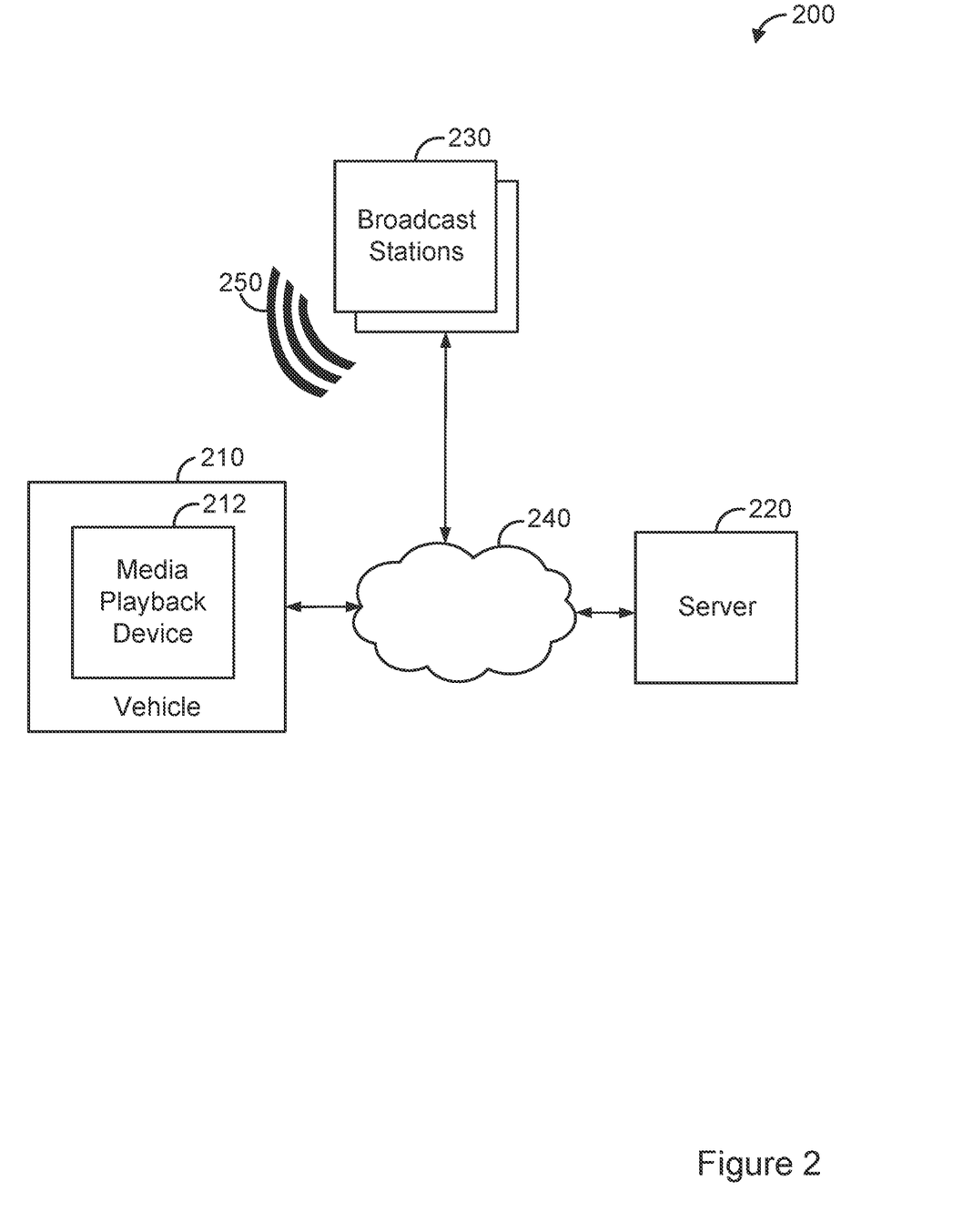
FIG. 2 is a simplified block diagram of an example radio station system.

FIG. 2 is a simplified block diagram of an example radio station system 200. The radio station system 200 can perform various acts and/or functions, and can be implemented as a computing system. In this disclosure, the term "computing system" means a system that includes at least one computing device. In some instances, a computing system can include one or more other computing systems.

The radio station system 200 can include various components, such as a vehicle 210, a server 220, and multiple broadcast stations 230. The vehicle 210 includes a media playback device 212. Each of the media playback device 212 and the server 220 can be implemented as a computing system. The media playback device 212 can communicate with the server 220 over a network 240. In addition, the server 220 and the broadcast stations 230 can communicate with each other and/or with other network entities over the network 240. The network 240 may be any network that enables communication between devices, such as a wired network and/or a wireless network (e.g., a mobile network).

The vehicle 210 can be a machine that transports people, such as an automobile, motorcycle, watercraft, or aircraft, for instance. The media playback device 212 of the vehicle 210 can include at least one computing device and can take various forms. By way of example, the media playback device 212 can include a head unit of the vehicle 210. The head unit can include a display and a user interface that provide a user of vehicle 210 with control over media content presented by the vehicle 210.

Each of the broadcast stations 230 can broadcast audio content and, optionally, related metadata, on one or more radio stations using radio waves 250. Each radio station can have an assigned frequency, such that the radio stations are distinguishable from one another. The radio stations over which the broadcast stations 230 broadcast can include amplitude modulation (AM) radio stations, frequency modulation (FM) radio stations, HD Radio (HDR) radio stations, and/or digital audio broadcasting (DAB) radio stations, for instance.

The media playback device 212 can include a receiver configured to receive the radio waves 250 and convert information carried by the radio waves into a usable form. The receiver can include tuners, decoders, and other hardware and/or software such that the media playback device 212 can receive and process content that is broadcast by the broadcast stations 230. Additionally, the media playback device 212 can include a communication interface through which the media playback device can communicate with the server 220. The communication interface can include network adapters, decoders, and other hardware and/or software such that the media playback device can send and receive data via network 240. Further, the media playback device 212 can include a vehicle interface for communicating with a computing system of the vehicle 210.

The media playback device 212 can also include a display configured to display a list of tunable radio stations and identifying information corresponding to audio content being provided on one or more radio stations. The display may be a flat-panel screen, a plasma screen, a light emitting diode (LED) screen, or a liquid crystal display (LCD), for instance.

The server 220 can include a database server. The server 220 can store radio station contour data for various radio stations. The radio station contour data for a given radio station can identify a geographic region within which the radio station is receivable. The geographic region within which the radio station is receivable can include a geographic region in which: the radio station is receivable without interference from other radio stations broadcasting on the same frequency as a frequency on which the radio station broadcasts, the radio station is receivable with a signal strength that satisfies a threshold condition (e.g., is greater than 60 dBu, is greater than 54 dBu, etc.), or both. In some examples, the radio station contour data for a given radio station can include a list of geographic coordinates that collectively define the boundaries of a polygon. In other examples, the radio station contour data for a given radio station can define a circle or multiple circular sectors.

In some instances, the server 220 can store radio station metadata. Examples of radio station metadata for a radio station include a frequency, a channel name, a channel identifier (e.g., a call sign), genre, and channel logo.

The server 220 can index the radio station contour data and radio station metadata using a geocode system. The use of a geocode system allows the server 220 to associate radio stations with geographic areas. For instance, the geocode system may define a plurality of geographic areas. For each radio station, the server 220 can determine which geographic areas of the plurality of geographic areas that a geographic region defined by the radio station contour data for the radio station overlaps, and associate the given radio station with those geographic areas.

In some examples, the server 220 can index the radio station contour data and radio station metadata using Geohashing. Geohashing encodes a geographic location into a short string of letters and digits, referred to as a Geohash. Accordingly, the server 220 can associate each radio station with one or more geohashes, with each Geohash corresponding to a respective geographic within a grid of geographic areas.

III. Example Operations

The radio station system 200 and/or components thereof can perform various acts and/or functions. Examples of these and related features will now be described.

A. Initializing the Database of the Media Playback Device

In line with the discussion above, the media playback device 212 includes a local database. As part of an initialization process, the server 220 can send radio station contour data and radio station metadata for one or more geographic areas to the media playback device 212. By way of example, when the media playback device 212 is powered on, the media playback device 212 can send a location of the vehicle 210 to the server 220. The server 220 can respond to the request by identifying radio station contour data and radio station metadata corresponding to a geographic area of the vehicle 210, and sending the radio station contour data and radio station metadata to the media playback device 212.

Figure 3:
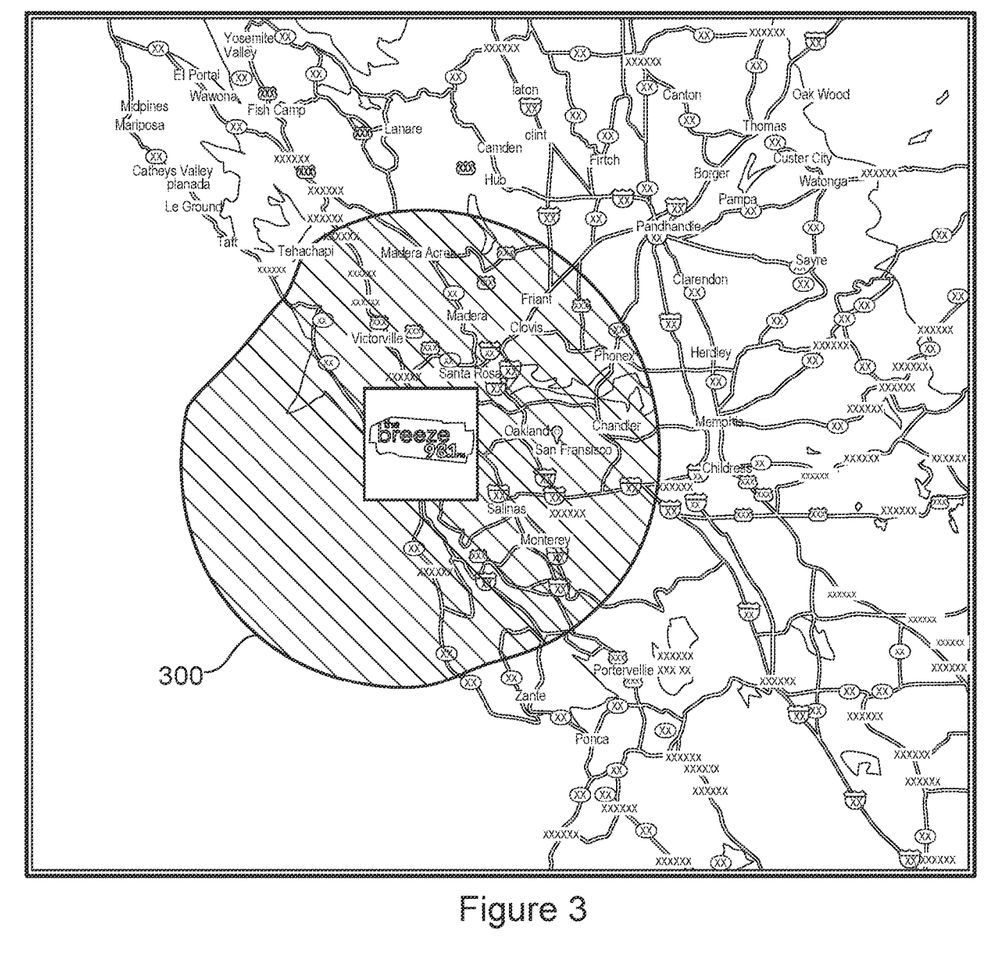
FIG. 3 is a conceptual illustration of a geographic region defined by radio station contour data.

FIG. 3 is a conceptual illustration of a geographic region 300 defined by radio station contour data for a radio station. As shown in FIG. 3, the geographic region 300 is an area within which a radio station (i.e. 98.1 MHz) is receivable, such as a region in which the radio station is receivable without interference from other radio stations broadcasting on 98.1 MHz, a region in which the radio station is receivable with a signal strength that satisfies a threshold condition, or both. In line with the discussion above, the geographic region 300 can be defined by a list of geographic coordinates that collectively define the boundaries of the geographic region 300.

Accordingly, when a location of the vehicle 210 is within the geographic region 300, the server 220 can send the radio station contour data for the radio station and radio station metadata for the radio station to the media playback device 212.

In some examples, the server 220 can also send radio station contour data and radio station metadata for other geographic areas adjacent to the geographic area to the media playback device 212. For instance, the media playback device 212 can determine geographic coordinates of the location of the vehicle 210, convert the geographic coordinates to a Geohash, and send the Geohash to the server 220. Alternatively, the media playback device 212 can send coordinates of the location of the vehicle 210 to the server, and the server 220 can convert the geographic coordinates to a Geohash. The server 220 can then respond by providing radio station contour data and radio station metadata for the Geohash to the media playback device 212.

The media playback device 212 can then store the radio station contour data and the radio station metadata in the local database of the media playback device 212.

Optionally, the server 220 can respond by providing to the media playback device 212 radio station contour data and radio station metadata for Geohashes surrounding the Geohash. As an example, the server 220 can provide radio station contour data and radio station metadata for eight Geohashes surrounding the Geohash, such that the data covers a three-by-three grid of nine Geohashes centered on the Geohash sent by the media playback device 212. This can reduce the number of communications between the server 220 and the media playback device 212, since the media playback device 212 receives radio station contour data and radio station metadata for not only the current location of the vehicle but also locations that are adjacent to the current location of the vehicle.

Figure 4:
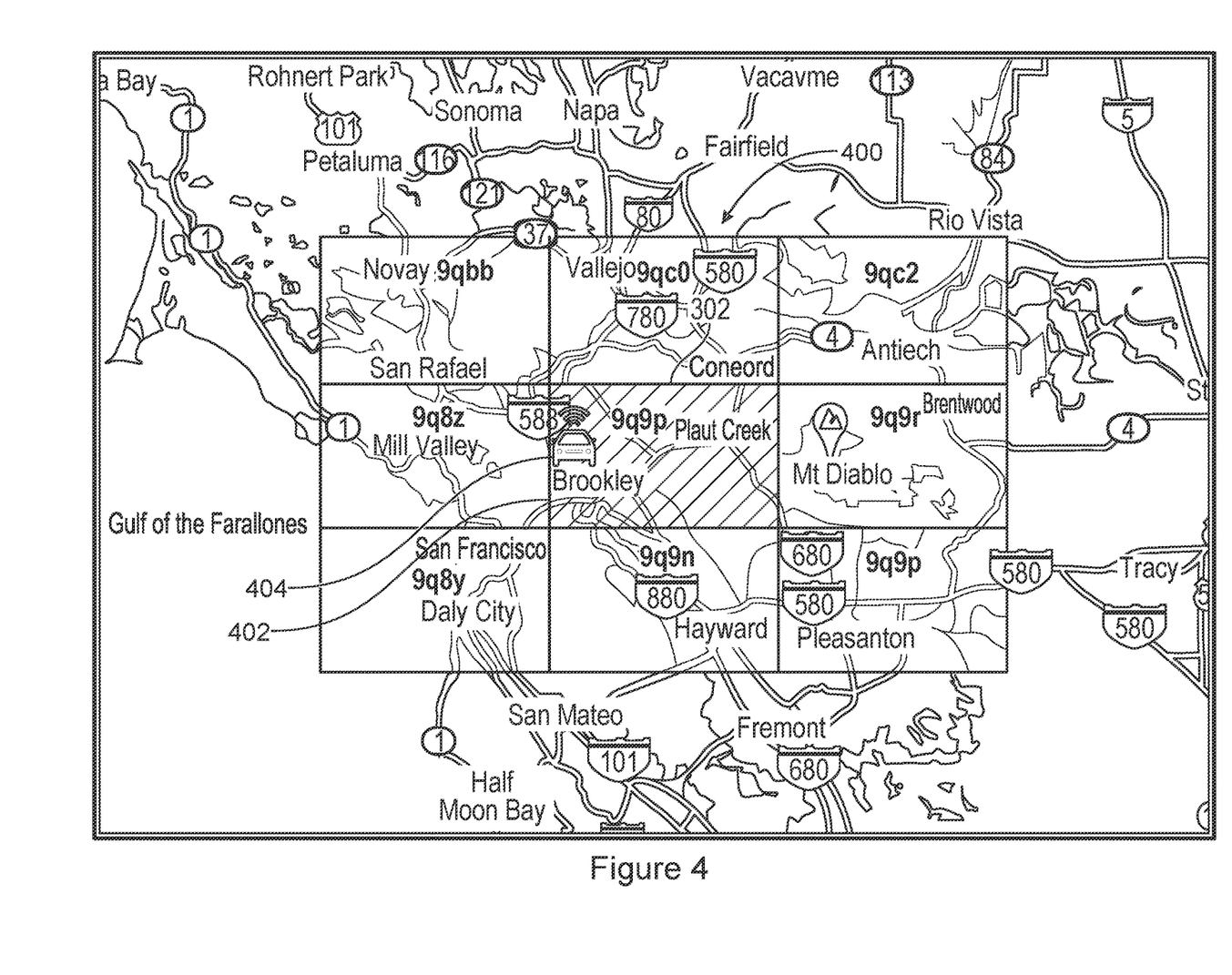
FIG. 4 shows an example grid of geographic areas.

FIG. 4 shows an example grid of Geohashes 400 surrounding a Geohash 402 corresponding to a location of a vehicle 404. In line with the approach discussed above, based on the server 220 determining that the vehicle 404 is located within the Geohash 402, the server 220 can provide radio station contour data and radio station metadata for each of Geohashes in the grid of Geohashes 400, such that the data covers a three-by-three grid of nine Geohashes centered on the Geohash 402.

The radio station contour data and the radio station metadata can include revision numbers indicative of when the data was last updated by server 220. Additionally or alternatively, the media playback device 212 can associate timestamps with the data for a Geohash when storing the data in the local database.

B. Using the Database of the Media Playback Device

The media playback device 212 can use the data stored in the local database to facilitate user navigation of radio stations. As an example, the media playback device 212 can determine a location of the vehicle 210, and determine which radio stations are tunable at the location of the vehicle 210 using the radio station contour data. For instance, for each of multiple radio stations for which the local database stores radio station contour data, the media playback device 212 can determine whether the location of the vehicle is within a geographic region identified by the radio station contour data. Upon determining that the location of the vehicle is within a geographic region identified by radio station contour data for a radio station, the media playback device 212 can include the radio station in a list of currently tunable radio stations. Further, the media playback device 212 can then display a station list using the list of currently tunable radio stations. Displaying the station list can involve retrieving metadata for the radio stations from the local database and displaying the metadata (e.g., a channel logo, frequency, and channel identifier).

Determining which radio stations are tunable using data stored in a local database of the media playback device can reduce the latency of lookups as compared to determining which radio stations are tunable by communicating with a server or using a secondary tuner to scan for tunable radio stations. Using the local database in this manner can also help alleviate issues of attempting to communicate with a server when the connection is unstable, such as in areas where the connection between the vehicle and the server is poor.

In some examples, the media playback device 212 can encounter a trigger to update the list of currently tunable radio stations. The trigger can be time-based or location-based. In some instances, encountering the trigger can involve determining that an elapsed amount of time since the media playback device 212 previously updated the list of currently tunable radio stations satisfies a threshold condition (e.g., is greater than five minutes, seven minutes, ten minutes, twenty minutes, etc.). In other instances, encountering the trigger can involve determining that a distance traveled by the vehicle 210 from a location that the media playback device 212 used for a previous update of the list of currently tunable radio stations satisfies a threshold condition (e.g., is greater than five miles, seven miles, ten miles, fifteen miles, etc.). The media playback device 212 can determine the distance traveled between updates based on odometer data or global positioning system (GPS) data received from vehicle 210.

Based on encountering the trigger to update the list of currently tunable radio stations, the media playback device 212 can update the list of currently tunable radio stations using the location of the vehicle 210 and the radio station contour data stored in the local database. As one example, updating the list of currently tunable radio stations can involve determining that the location of the vehicle is within a geographic region within which a radio station is receivable, the radio station not being included in the list of currently tunable radio stations, and adding the radio station to the list of currently tunable radio stations. Adding the radio station to the list of currently tunable radio stations can involve retrieving radio station metadata for the radio station from the local database. As another example, updating the list of currently tunable radio stations can involve determining that the location of the vehicle 210 is within a geographic region within which a radio station is receivable, and updating radio station metadata for the radio station. After updating the list of currently tunable radio stations, the media playback device 212 can display a station list using the list of currently tunable radio stations.

Figure 5:
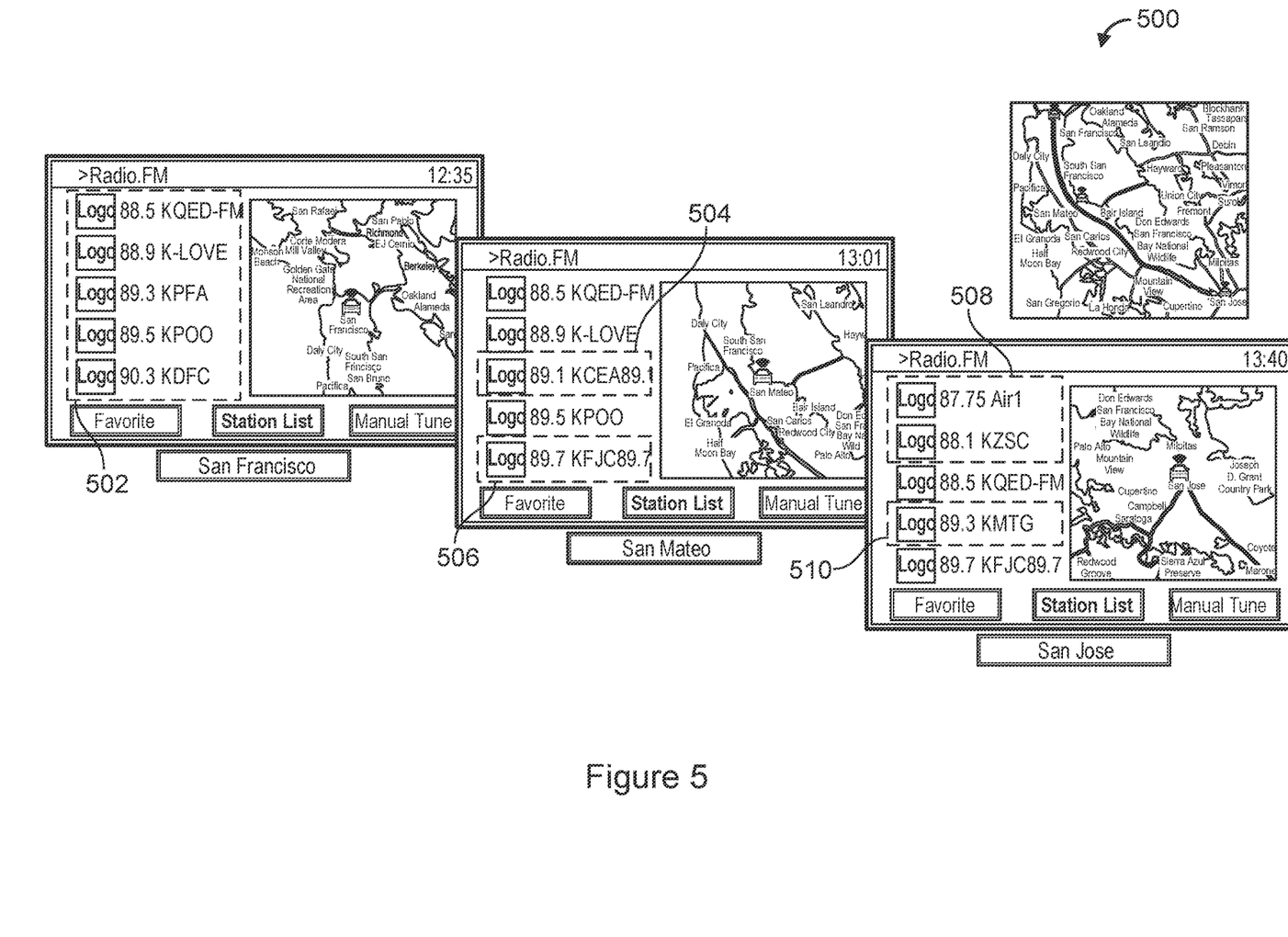
FIG. 5 is a conceptual illustration of updating a list of currently tunable radio stations as a vehicle travels.

FIG. 5 illustrates a conceptual illustration 500 of updating the list of currently tunable radio stations as the vehicle 210 travels. As shown in FIG. 5, the vehicle 210 may travel from San Francisco, California to San Jose, California. While in San Francisco, the media playback device 212 can display a first station list 502. The first station list 502 includes a portion of radio stations in the list of currently tunable radio stations.

When the vehicle 210 is in San Mateo, the media playback device 212 updates the list of currently tunable radio stations, and displays a second station list. A first box 504 and a second box 506 highlight a first radio station and a second radio station, respectively, that are added to the list of currently tunable radio stations and displayed in the second station list.

When the vehicle is in San Jose, the media playback device 212 updates the list of currently tunable radio stations again, and displays a third station list. A third box 508 and a fourth box 510 highlight additional radio stations that are added to the list of currently tunable radio stations and displayed in the third station list.

C. Predicting and Avoiding Fading and Drifting

Generally, the effective range of an FM radio station is about twenty-five miles. Once outside this range, a listener may notice fading and drifting, which increase with the distance from the radio transmitter or along the edges of the contour. It is also common that there are several distortions. For instance, FM signals are reflective, making it possible for two signals to reach a receiver at the same time. If this happens, the signals will cancel each other out, causing a momentary flutter or loss of reception. As another example static and fluttering can occur when signals are blocked by buildings, trees, or other large objects. Station swapping is another potential issue. If a media playback device is tuned to a first radio station, and the signal for the radio station is interrupted or weakened, and there is a second strong radio station nearby on the FM band, the media playback device may tune to the second radio station until the signal for the first radio station can be picked up again. Fading is another potential issue. AM broadcasts are reflected by the upper atmosphere, especially at night. These reflected signals can interfere with those received directly from the radio station, causing the radio station to sound alternately strong and weak. As still another example, when a reflected signal and a signal received directly from a radio station are very nearly the same frequency, the two signals can interfere with each other, making it difficult to hear the broadcast. AM radio signals are also easily affected by external sources of electrical noise, such as high tension power lines, lightning, or electrical motors, resulting in static.

The media playback device 212 can predict and avoid the above situations and potentially others using radio station contour data that is stored in the database of the media playback device 212. By way of example, when the location of the vehicle 210 is approaching the edge of a geographic area identified by radio station contour data for a radio station that the media playback device 212 is tuned to, the media playback device 212 can lower the volume, turn off the radio, or recommend tuning to another radio station (e.g., a radio station of the same genre that is in the list of currently tunable radio stations). For instance, the media playback device 212 can carry out one or more of these actions when the location of the vehicle 210 is within a threshold distance (e.g. half a mile, one mile, three miles) of an edge of a geographic area specified by the radio station contour data for a radio station.

As another example, when the location of the vehicle 210 is approaching the edge of a geographic area identified by radio station contour data for a radio station that the media playback device 21 is tuned to, the media playback device 212 can switch to an Internet radio stream corresponding to the radio station. The URL of the Internet radio stream may be stored in the database of the media playback device 212. Or the media playback device 212 can query a server to determine the Internet radio stream. In some instances, prior to switching to the Internet radio stream, the media playback device 212 can present an option to the user seeking approval to switch to the Internet radio stream. For example, the option can be presented to the user when the location of the vehicle is approaching the edge of the geographic area identified by the radio station contour data. Alternatively, an option to enable switching to Internet radio streams can be presented once during initialization of the media playback device 212 or configured via settings of the media playback device 212.

In examples in which the media playback device 212 has access to route information for the vehicle 210, the media playback device 212 can predict and present a data cost associated with switching to an Internet radio stream prior to switching to the Internet radio stream. For instance, the media playback device 212 can determine, based on the route information, a length of time that the vehicle will be outside of the geographic area identified by the radio station contour data. The media playback device 212 can then determine a bitrate of the Internet radio stream. The bitrate may be part of the radio station metadata for the radio station. Or the media playback device 212 can request the bitrate from a server, or use a default bitrate as the bitrate. Further, the media playback device 212 can then calculate a data cost using the bitrate and the length of time. For instance, the media playback device 212 can predict that the location of the vehicle will be outside of the geographic area for one hour along the route, and that tuning to a 128 kbps stream for the one hour will use about 60 Megabytes of data. The media playback device 212 can present the estimated data cost to the user, such that the user can use the information to decide whether to switch to the Internet radio stream.

D. Updating the Database of the Media Playback Device

In some examples, the media playback device 212 determines whether the local database includes valid radio station data (e.g., radio station contour data and/or radio station metadata). For instance, when the media playback device 212 is powered on and/or periodically (e.g., every few minutes, every half hour, once per day, etc.), the media playback device 212 determines a location of the vehicle 210 and a Geohash corresponding to the location of the vehicle 210. The media playback device 212 then determines whether radio station data for the Geohash, and optionally for a predetermined number of Geohashes surrounding the Geohash, is stored in the local database. Upon determining that radio station data for the Geohash or surrounding Geohashes is missing, the media playback device 212 requests the radio station data from the server 220.

In some examples, radio station data for a Geohash (e.g. radio station contour data and/or radio station metadata for a Geohash) includes an associated expiration date. The expiration date may be a date or a duration of time for which the data is valid starting at a time at which the data is downloaded. With this approach, when the media playback device 212 is powered on and/or periodically (e.g., every few minutes, every half hour, once per day, etc.), the media playback device 212 determines a location of the vehicle 210 and a Geohash corresponding to the location of the vehicle 210. The media playback device 212 then determines whether radio station data for the Geohash, and optionally for a predetermined number of Geohashes surrounding the Geohash, stored in the local database is stale based on the expiration date. Upon determining that radio station data for the Geohash or surrounding Geohashes is stale, the media playback device 212 requests the radio station data from the server 220.

In some examples, when media playback device 212 requests updated radio station data from server 220, the media playback device can include a list of Geohashes and their respective revisions. The server 220 can use the revision information to determine an appropriate response. For instance, the response to an update request can include a list of objects that have been modified, deleted, or added with respect to the Geohashes and their respective revisions.

In some examples, the media playback device 212 can prefetch radio station data ahead of time. For instance, if the media playback device 212 obtains route information for the vehicle, such as a destination, the media playback device 212 can determine whether any radio station data is missing for geographic areas between the location of the vehicle and the destination. Upon determining that radio station data for a geographic area (e.g., for a Geohash) along the route is not stored in the local database of the media playback device 212, the media playback device 212 can send an update request to the server 220, with the request specifying the geographic area. In a similar manner, the media playback device can send route information or a current location and a destination to the server 220. The server 220 can then determine whether any radio station data is missing for geographic areas between the location of the vehicle and the destination, and respond accordingly to provide any missing radio station data to the media playback device 212. This approach may be beneficial in scenarios where there are potential intermittent connectivity issues along the route.

The use of the local database of the media playback device 212 and the periodic inquires as to whether the radio station data is valid reduces the amount of data consumed by the media playback device 212 through communication of update requests and corresponding responses to the update requests. Because the local database stores radio station data for a Geohash, and optionally multiple surrounding Geohashes, the media playback device 212 does not need to continually query the server 220 to determine new radio station data as the vehicle 210 travels.

In an alternative system, the media playback device 212 can query the server 220 for a list of currently tunable radio stations whenever the media playback device encounters the trigger to update the list of currently tunable radio stations, and the server 220 can respond with a list of currently tunable radio stations. With this approach, the query to the server 220 can specify a location of the vehicle 210, and the server 220 can compare the location of the vehicle to the latest radio station data contour stored by the server 220. This approach may result in the radio station metadata for the list of currently tunable radio stations to be more up-to-date, but consumes more communication data as compared to the approach that utilizes the local database of the media playback device 212 to update the list of currently tunable radio stations.

E. Crowdsourcing Radio Station Contour Data

In some examples, the media playback device 212 determines that the media playback device 212 is tuned to a radio station that is not included in the list of currently tunable radio stations and is receivable at the location of the vehicle with a signal strength that satisfies a threshold condition (e.g., is greater than 54 dBu, is greater than 60 dBu, is greater than 70 dBu, etc.). Based on this determination, the media playback device 212 stores data indicative of the radio station and the location of the vehicle 210. The data can also include data indicative of the current temperature, weather, altitude, and/or time of day. The media playback device 212 can send a log of all such occurrences to another network entity (e.g., the server 220) for use in generating or modifying radio station contour data.

F. Example Method

Figure 6:
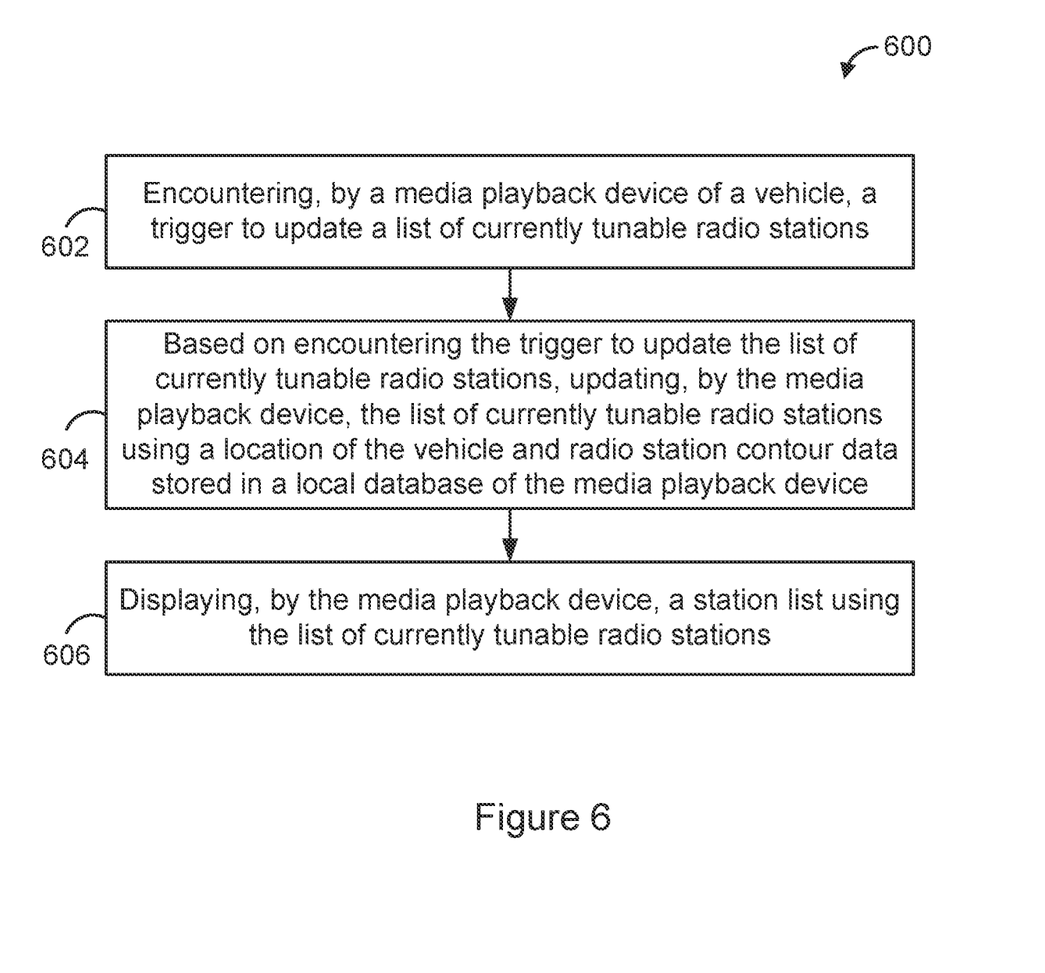
FIG. 6 is a flow chart of an example method.

FIG. 6 is a flow chart illustrating an example method 600. The method 600 can be carried out by a media playback device, such as any of the media playback devices described herein. At block 602, the method 600 can include encountering, by a media playback device of a vehicle, a trigger to update a list of currently tunable radio stations. At block 604, the method 600 can include based on encountering the trigger to update the list of currently tunable radio stations, updating, by the media playback device, the list of currently tunable radio stations using a location of the vehicle and radio station contour data stored in a local database of the media playback device. And at block 606, the method 600 includes displaying, by the media playback device, a station list using the list of currently tunable radio stations.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A method comprising:
encountering, by a media playback device of a vehicle, a trigger to update a list of currently tunable radio stations;
based on encountering the trigger to update the list of currently tunable radio stations, updating, by the media playback device, the list of currently tunable radio stations using a location of the vehicle and radio station contour data stored in a local database of the media playback device; and
displaying, by the media playback device, a station list using the list of currently tunable radio stations, wherein the list of currently tunable radio stations identifies one or more radio stations that are: receivable at the location of the vehicle without interference from other radio stations broadcasting on a same frequency as a frequency on which the one or more radio stations broadcast, receivable at the location of the vehicle with a signal strength that satisfies a threshold condition, or both.

2. The method of claim 1, wherein encountering the trigger to update the list of currently tunable radio stations comprises determining that a distance traveled by the vehicle from a location that the media playback device used for a previous update of the list of currently tunable radio stations satisfies a threshold condition.

3. The method of claim 1, wherein encountering the trigger to update the list of currently tunable radio stations comprises determining that an elapsed amount of time since the media playback device previously updated the list of currently tunable radio stations satisfies a threshold condition.

4. The method of claim 1, wherein the radio station contour data identifies, for the one or more radio stations, a geographic region within which a radio station is receivable.

5. The method of claim 4, wherein updating the list of currently tunable radio stations using the location of the vehicle and the radio station contour data comprises:
determining that the location of the vehicle is within a geographic region within which the radio station is receivable, wherein the radio station is not in the list of currently tunable radio stations; and
adding the radio station to the list of currently tunable radio stations.

6. The method of claim 5, wherein adding the radio station to the list of currently tunable radio stations comprises retrieving metadata for the radio station from the local database.

7. The method of claim 4, wherein the geographic region within which the radio station is receivable is a geographic region in which: the radio station is receivable without interference from other radio stations broadcasting on the same frequency as a frequency on which the radio station broadcasts, the radio station is receivable with a signal strength that satisfies a threshold condition, or both.

8. The method of claim 1, wherein updating the list of currently tunable radio stations using the location of the vehicle and the radio station contour data comprises:
determining that the location of the vehicle is within a geographic region within which a radio station is receivable; and
updating metadata associated with the radio station.

9. The method of claim 1, wherein:
the local database stores radio station contour data for multiple geographic areas, and
wherein the method further comprises:
encountering, by the media playback device, a trigger to update the radio station contour data stored in the local database,
based on encountering the trigger to update the radio station contour data, sending, by the media playback device to a server, a database update request, and
receiving, by the media playback device, radio station contour data for a geographic area.

10. The method of claim 9, wherein encountering the trigger to update the radio station contour data comprises determining that radio station contour data for the geographic area is missing or stale.

11. The method of claim 1, wherein:
the local database stores radio station metadata for multiple geographic areas, and
wherein the method further comprises:
encountering, by the media playback device, a trigger to update the radio station metadata stored in the local database,
based on encountering the trigger to update the radio station metadata, sending, by the media playback device to a server, a database update request, and
receiving, by the media playback device, radio station metadata for a geographic area.

12. The method of claim 11, wherein encountering the trigger to update the radio station contour data comprises determining that radio station metadata for the geographic area is missing or stale.

13. The method of claim 1, further comprising:
determining, by the media playback device, that the media playback device is tuned to a radio station that is not included in the list of currently tunable radio stations and is receivable at the location of the vehicle with a signal strength that satisfies a threshold condition; and based on the determining that the media playback device is tuned to the radio station, storing, by the media playback device, data indicative of the radio station and the location of the vehicle.

14. A computing system configured for performing a set of acts comprising:

encountering a trigger to update a list of currently tunable radio stations for a media playback device of a vehicle;

based on encountering the trigger to update the list of currently tunable radio stations, updating the list of currently tunable radio stations using a location of the vehicle and radio station contour data stored in a local database of the media playback device; and displaying a station list using the list of currently tunable radio stations, wherein the list of currently tunable radio stations identifies one or more radio stations that are: receivable at the location of the vehicle without interference from other radio stations broadcasting on a same frequency as a frequency on which the one or more radio stations broadcast, receivable at the location of the vehicle with a signal strength that satisfies a threshold condition, or both.

15. The computing system of claim 14, wherein encountering the trigger to update the list of currently tunable radio stations comprises determining that a distance traveled by the vehicle from a location that the media playback device used for a previous update of the list of currently tunable radio stations satisfies a threshold condition.

16. The computing system of claim 14, wherein encountering the trigger to update the list of currently tunable radio stations comprises determining that an elapsed amount of time since the media playback device previously updated the list of currently tunable radio stations satisfies a threshold condition.

17. A non-transitory computer-readable medium having stored thereon program instructions that upon execution by a processor, cause performance of a set of acts comprising:

encountering a trigger to update a list of currently tunable radio stations for a media playback device of a vehicle;

based on encountering the trigger to update the list of currently tunable radio stations, updating the list of currently tunable radio stations using a location of the vehicle and radio station contour data stored in a local database of the media playback device; and displaying a station list using the list of currently tunable radio stations, wherein the list of currently tunable radio stations identifies one or more radio stations that are: receivable at the location of the vehicle without interference from other radio stations broadcasting on a same frequency as a frequency on which the one or more radio stations broadcast, receivable at the location of the vehicle with a signal strength that satisfies a threshold condition, or both.

18. The non-transitory computer-readable medium of claim 17, wherein encountering the trigger to update the list of currently tunable radio stations comprises determining that a distance traveled by the vehicle from a location that the media playback device used for a previous update of the list of currently tunable radio stations satisfies a threshold condition.

19. The non-transitory computer-readable medium of claim 17, wherein encountering the trigger to update the list of currently tunable radio stations comprises determining that an elapsed amount of time since the media playback device previously updated the list of currently tunable radio stations satisfies a threshold condition.

20. The method of claim 1, wherein the station list further comprises at least one internet radio stream corresponding to the one or more radio stations in the list of currently tunable radio stations.

* * * * *